United States Patent Office 2,858,299
Patented Oct. 28, 1958

2,858,299

PROCESS FOR PULVERIZING POLYETHYLENE

Giuseppe Guzzetta, Milan, Italy, assignor to Montecatini Societa Generale per l'Industria Mineraria e Chimica, Milan, Italy, a corporation of Italy No Drawing. Application March 16, 1954
Serial No. 416,711

Claims priority, application Italy April 2, 1953

4 Claims. (Cl. 260—94.9)

This invention relates to a process for pulverizing polyethylene.

It is known to use polyethylene powder for coating metallic surfaces for the purpose of protecting them against corrosion.

To apply such coatings, either heat spraying is employed by using a technique similar to other heat-spraying methods of metals, or the powder is spread upon the surface to be coated, and the temperature then is raised to allow the polyethylene to melt and to form a lustrous, continuous protective film.

However, it is difficult to pulverize polyethylene in the dry state. This is because polyethylene, like almost all other plastics, will melt during a normal grinding operation, due to the heat of friction and because of its poor thermal conduction, before it can be converted into a powder. One of the procedures for grinding polyethylene consists in cooling it to a temperature far lower than 0° C., for example by means of a liquid nitrogen spray (−170° C.) so as to make it rigid and brittle before it is passed through a grinding mill. However, this method produces a granulation which is too coarse and the process is relatively costly.

According to the British Patents Nos. 571,814 and 617,052, powdered polyethylene is obtained by preparing diluted solutions containing 10% by weight of polyethylene in a solvent, such as gasoline or xylene, at a temperature above 70° C. Upon cooling the solution, polyethylene settles in form of a very fine powder which, after filtration, contains a very high percentage of absorbed solvent (up to 50%). Drying and grinding must be carried out at controlled temperatures since the powder is inclined to agglomerate to hard grains.

According to U. S. Patent No. 2,582,327, another wet process for pulverizing polyethylene consists in heating the material up to melting temperature while mixing it intimately with a small quantity of water or another non-solvent liquid. By cooling to a temperature at which the mixture is still resilient, and by subjecting it to a grinding action, the polyethylene is converted to long and thin fibers. However, for reducing it to a powder, the polyethylene must be subjected to a mechanical grinding treatment at a temperature higher than the preceding one, always in the presence of the said non-solvent liquid.

This procedure is slow and complex. Moreover, the control of both cooling and pressure during the two steps of the procedure is difficult.

The object of this invention is a process far more simple and economic than the afore-mentioned processes for reducing polyethylene to a fine powder. It differs from the above-mentioned processes as follows. I have found unexpectedly that polyethylene in any form, e. g. grains, sheets, lumps, etc., can be converted into a very fine powder or to an equivalent state of aggregation regardless of what mechanical force is applied for reducing the particle size, if the polyethylene is kept at a temperature between 50° C. and its melting point, preferably between 70 and 110° C., depending upon the molecular weight.

If, for instance, in a first treatment step, polyethylene is passed through a mixer comprising two rolls close to one another, and if the temperature is kept within the above-stated limits, a treatment of 3 to 4 passes between the mixer rolls within two to ten minutes will convert the material to such a soft, light and friable mass that even finger pressure will suffice to reduce it to a very fine powder provided it is still warm.

Without binding myself by any theoretical speculations, the mixed, amorphous-crystalline nature of polyethylene could explain such a behavior. Within the crystalline regions, which in polyethylene at room temperature exist at a ratio 3:1 to amorphous regions, the chains are perfectly aligned and offer great resistance to fiber relocation since, normally, the mutual cohesion among the chains is wholly utilized.

When the temperature rises, the chain motion is increased and the chains become separated from each other until they assume a random arrangement.

It is significant in this connection that, within the said temperature range, sharp changes occur in some of the physical characteristics of polyethylene; e. g. in the refractive index, specific heat, density, etc. (see Ind. Chem. Eng. 37, No. 6, page 527).

At the moment when the bonds among the chains are relaxed, it is possible to separate the polyethylene fiber bundles and to convert the material into minute aggregates. Whichever the explanation may be, the fact is that by operating under the above-stated conditions, a very fine powder can be obtained.

Aside from the simplicity and the favorable economic features of the invention, the pulverizing of polyethylene according to the herein-claimed method offers the following advantages: (a) a superior product is obtained since the degradation symptoms characteristic of other grinding processes are absent, (b) no special equipment is required, (c) the procedure is very fast and adaptable for continuous operation, (d) material of any molecular weight and any shape may be used, and (e) a powder is obtained which is particularly suitable for heat-spraying applications.

Having described the principle of the new process, the examples are given to illustrate, but in no way limit, the invention.

Example 1

20 kg. of grade 200 grain polyethylene, of a molecular weight of approximately 13,000, are passed between the two rolls of a mixer while the roll temperature is being kept at about 75 to 80° C. After 4 to 6 passes within about two minutes, the material is converted into a soft, friable mass which is easily pulverized upon passing it through a mill heated to the same temperature. A powder of such minute particle size is obtained that a portion of 75% thereof passes through a screen of 200 mesh per square centimeter; 57% of this portion is of still smaller particle size since it is able to pass through a 1000 mesh per square centimeter screen. The particle size depends upon the means used for crumbling the soft mass obtained in the mixer, but powder passing the 200 mesh per square centimeter screen will suffice for spray-coating purposes.

The portion which does not pass through the 200 mesh per square centimeter screen (about 25%) is reworked under the same conditions and results in a powder of which 82% passes through the 200 mesh per square centimeter screen.

Example 2

20 kg. of grade 7 polyethylene of an approximate mol. weight of 18,000 is passed between the two rolls of a mixer while keeping the roll temperature at about 100 to 105° C. After 4 to 8 passes within about four to five minutes, the material changes to a soft, friable mass which, in order to crumble it, is passed through a grinding mill heated to about the same temperature.

A powder is obtained of which 60.8% passes through a 200 mesh per square centimeter screen. With polyethylene of different molecular weight, the ratio may vary from 60 to 80%.

For the purpose and within the scope of this invention, any polyethylene material can be used, since it suffices to bring polyethylene to a temperature below its melting point but sufficiently high to greatly weaken the forces of cohesion between the molecular chains and to break up the crystalline structure so that suitably applied mechanical forces can completely separate the fibers and reduce the polyethylene to a powder.

It will be evident that the process may be carried out by means of any apparatus capable of exerting the required mechanical action while keeping the material at the proper temperature which, depending on the molecular weight of the material, may vary from 50° C. to a temperature somewhat below the melting point. Thus, it is not a requirement to use, as in the foregoing examples, first a roll-type mixer to obtain the soft, friable material and to then charge this material into a grinding mill in order to pulverize it. The entire process may also be carried out in a single device, such as a strongly-built hammer mill, grinding mill or rod mill, provided the material can be maintained therein at the required temperature for the required length of time. Usually, this is not difficult, since the first operation step of producing a soft, friable mass does not take more than two to fifteen minutes, and the entire operation no more than ten to twenty-five minutes.

It was entirely unpredictable that the soft, friable mass resulting from the first production step would crumble into a very small particle size powder upon further mastication at the same temperature. One explanation of this phenomenon may be that each individual particle, once separated from the bulk of the friable mass, attains an electrostatic potential against the mass which prevents reincorporation of the particle in the mass.

Because of its particular morphological properties and flaky character, polyethylene powder prepared in this manner is suitable for spraying without any risk of nozzle obstruction, which frequently occurs when using other polyethylene powders.

The process may be applied to either polyethylene as such, or to polyethylene which is colored or mixed with fillers or other ingredients, resulting in powders of the pure material or the respective mixtures.

The molecular weight of a powder made according to the above examples corresponds with the molecular weight of the starting material.

I claim:
1. A thermo-mechanical process for reducing polyethylene to a small particle size powder passing a screen of 200 mesh per square centimeter, which comprises subjecting dry polyethylene of any physical form larger than said small particle size powder to mechanical pressing forces sufficient to alter said physical form while maintaining the polyethylene at a temperature between 70 and 105° C., and continuing subjecting said polyethylene to said mechanical pressing forces at said temperature until it changes into a soft, friable mass and said mass into a small particle size powder.

2. A thermo-mechanical process for reducing dry polyethylene to a small particle size powder passing a screen of 200 mesh per square centimeter which comprises subjecting, for a period from two to fifteen minutes, polyethylene of any physical form larger than said small particle size powder to mechanical pressing forces sufficient to alter said physical form while maintaining the polyethylene at a temperature between 70 and 105° C., and continuing subjecting the resulting soft, friable mass to said mechanical pressing forces at said temperature until said mass changes into a small particle size, loose powder.

3. A process of reducing coarse polyethylene particles to a powder passing a screen of 200 mesh per square centimeter, which comprises passing said coarse polyethylene particles four to eight times between the rolls of a two roll mill heated to a temperature between 75 and 80° C., charging the resulting soft, friable mass into a grinding mill heated to the same temperature, grinding until said mass changes into a small particle size, loose powder and separating 60 to 80% of said powder by sifting through a screen of 200 mesh per square centimeter.

4. A process according to claim 3, wherein the remaining 20 to 40% of said powder is reworked in accordance with the aforesaid claim.

References Cited in the file of this patent

UNITED STATES PATENTS

| 2,386,674 | Flint | Oct. 9, 1945 |
| 2,727,693 | Cairns | Dec. 20, 1955 |

FOREIGN PATENTS

| 688,403 | Great Britain | Mar. 4, 1953 |